United States Patent
Dusanapudi et al.

(10) Patent No.: US 10,241,880 B2
(45) Date of Patent: *Mar. 26, 2019

(54) EFFICIENT VALIDATION/VERIFICATION OF COHERENCY AND SNOOP FILTERING MECHANISMS IN COMPUTING SYSTEMS

(71) Applicant: International Business Machines Corporation, Armonk, NY (US)

(72) Inventors: Manoj Dusanapudi, Bangalore (IN); Shakti Kapoor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/429,052

(22) Filed: Feb. 9, 2017

(65) Prior Publication Data
US 2017/0220440 A1     Aug. 3, 2017

Related U.S. Application Data

(63) Continuation of application No. 14/994,453, filed on Jan. 13, 2016, now Pat. No. 9,612,929.

(51) Int. Cl.
*G06F 11/00* (2006.01)
*G06F 11/263* (2006.01)
*G06F 11/22* (2006.01)

(52) U.S. Cl.
CPC ........ *G06F 11/263* (2013.01); *G06F 11/2242* (2013.01); *G06F 11/2247* (2013.01)

(58) Field of Classification Search
CPC . G06F 11/2242; G06F 11/2247; G06F 11/263
See application file for complete search history.

(56) References Cited

U.S. PATENT DOCUMENTS

| 7,747,908 | B2 | 6/2010 | Choudhury et al. |
| 9,612,929 | B1 | 4/2017 | Dusanapudi et al. |
| 2008/0109585 | A1* | 5/2008 | DeMent .............. G06F 12/0817 710/113 |

(Continued)

OTHER PUBLICATIONS

Gibbons et al., "On Testing Cache-Coherent Shared Memories", 1994 Proceedings of the sixth annual ACM symposium on Parallel algorithms and architectures, pp. 177-188.*

(Continued)

*Primary Examiner* — Michael Maskulinski
(74) *Attorney, Agent, or Firm* — Patterson + Sheridan, LLP (57) ABSTRACT

Embodiments disclose techniques for scheduling test cases without regeneration to verify and validate a computing system. In one embodiment, a testing engine generates a test case for a plurality of processors. Each test case includes streams of instructions. The testing engine also allocates at least one cache line associated with the streams of instructions of the generated test case such that each of the plurality of processors accesses different memory locations within the at least one cache line. The testing engine further schedules the generated test case for execution by the plurality of processors to achieve at least a first test coverage among the plurality of processors. The testing engine further re-schedules the generated test case for re-execution by the plurality of processors to achieve at least a second test coverage among the plurality of processors.

20 Claims, 7 Drawing Sheets

(56) References Cited

U.S. PATENT DOCUMENTS

| | | | |
|---|---|---|---|
| 2009/0024876 A1* | 1/2009 | Arora | G06F 11/261 714/42 |
| 2010/0011248 A1* | 1/2010 | Bussa | G06F 11/2236 714/25 |
| 2015/0019846 A1 | 1/2015 | Duale et al. | |
| 2015/0221396 A1* | 8/2015 | Subramaniam | G06F 11/2635 714/720 |
| 2015/0301108 A1* | 10/2015 | Hamid | G01R 31/3177 714/724 |
| 2015/0309847 A1* | 10/2015 | Aggarwal | G06F 9/524 712/216 |
| 2016/0162381 A1* | 6/2016 | Hendrickson | G01R 31/31813 714/33 |

OTHER PUBLICATIONS

IBM, List of IBM Patents or Patent Applications Treated As Related, for U.S. Appl. No. 15/429,052, filed May 8, 2018.

* cited by examiner

EFFICIENT VALIDATION/VERIFICATION OF COHERENCY AND SNOOP FILTERING MECHANISMS IN COMPUTING SYSTEMS

CROSS-REFERENCE TO RELATED APPLICATIONS

This application is a continuation application and claims priority from co-pending U.S. patent application Ser. No. 14/994,453, entitled "EFFICIENT VALIDATION/VERIFICATION OF COHERENCY AND SNOOP FILTERING MECHANISMS IN COMPUTING SYSTEMS," filed on Jan. 13, 2016, which is incorporated herein in its entirety.

BACKGROUND

The present disclosure generally relates to using test cases to verify and validate a processor, and more specifically, to techniques for scheduling test cases without regeneration to verify and validate a computing system.

For many years, the performance of a computing system was typically increased by increasing the clock speed or processor frequency of the computing system. In recent years, however, with limitations in frequency scale up, increases in computing performance are now typically associated with increases in the number of cores in a chip and/or the number of chips in a given computing system. Most of these computing systems are symmetric multiprocessor (SMP) systems with distributed shared memory where each chip has its own local memory (e.g., cache). Shared memory systems usually contain a hierarchy of caches where the lowest cache levels are private to each individual processing unit and the last level cache is shared among all the processing units. In such memory systems, it is important to ensure the local caches are in sync, e.g., to prevent processing units from processing old data.

Before processors are shipped out to customer(s), chip manufacturers typically employ processor testing tools to screen for defective chips (or chips that do not meet performance requirements) that are produced from the manufacturing process. These testing tools typically use a wide variety of test patterns to verify and validate a system design for a processor. The goal of such tools is typically to generate the most stressful test pattern for a processor to ensure that the processor will meet the customer's performance requirements. In theory, the generated test pattern should provide maximum test coverage and should stress various timing scenarios on the processor. As such, a large amount of test cases are usually generated in order to sufficiently test a processor.

Verifying and validating a processor using test pattern(s) generally includes three stages: (1) a test pattern generation stage; (2) a test pattern loading stage; and (3) a test pattern execution stage. Each test pattern can include one or more test cases, and each test case can include one or more instructions. One challenge is that during the test pattern generation stage, it is typically difficult to create test generators that can efficiently verify and validate snoop filtering mechanisms for computing systems with multiple processors. For example, validating such mechanisms requires the generation of large amounts of test cases that can span the different states associated with the coherency protocol. Generating such a large amount of test cases requires a significant amount of test pattern generation time, which reduces the amount of time available for other stages (e.g., executing stage, etc.) of the testing process.

SUMMARY

One embodiment presented herein describes a method. The method generally includes generating a test case for a plurality of processors. Each test case includes streams of instructions. The method also includes allocating at least one cache line associated with the streams of instructions of the generated test case such that each of the plurality of processors accesses different memory locations within the at least one cache line. The method further includes scheduling the generated test case for execution by the plurality of processors to achieve at least a first test coverage among the plurality of processors. Scheduling the generated test case includes spreading the generated test case across a plurality of different configurations of the plurality of processors. Each configuration specifies a number of hardware threads for one or more of the plurality of processors that have access to the same cache line associated with the generated test case.

Other embodiments include, without limitation, a computer program product that includes a non-transitory storage medium having computer-readable program code that enables a processing unit to implement one or more aspects of the disclosed methods as well as a system having a processor, memory, and application programs configured to implement one or more of the disclosed methods.

DETAILED DESCRIPTION

Embodiments presented herein disclose techniques for reducing the time associated with validating coherency and snoop filtering mechanisms in computing systems. As described below, using the techniques presented herein, test cases for verifying and validating a processor can be spread, without regeneration, on different threads/cores in such a way that the test cases cover the different processing cores, caches, etc., of the computing system in the shortest possible time.

Traditional testing systems typically build a new set of test cases for each processor implementation and/or configuration. For example, as described below, large SMP systems with multiple processors are generally capable of processing/running multiple applications in parallel. When these applications are running, the applications may attempt to access data stored in memory (e.g., L1 cache, L2 caches, main memory, etc.) in parallel. Accessing data in this manner can create traffic on the system bus, which can further generate transition conflicts regarding the state of the different caches in the system. Before shipping a processor to a customer, most designers typically use testing systems to verify and validate the processor (e.g., by stressing the different types of transitions which can occur in a given processor). To do so, these traditional systems typically generate a new set of test cases for each type of transition that can occur for a processor in a given configuration. As a result, traditional testing systems generally spend large amounts of time in generating test cases to execute on a given processor. The large amount of time spent on generation reduces the amount of time that can be spent in running the test cases, which reduces the chances of the identifying data corruption bugs, system defects, etc.

Embodiments presented herein provide techniques for reducing the time it takes to generate a set of test cases for a given system within a given configuration, so that the bulk of time in the testing process can be spent running the test rather than generating the test cases. Embodiments presented herein also provide techniques for generating a set of test cases that (without regeneration) can validate a greater amount of transitions and/or configurations for a given processor (or computing system). For example, as described below, the techniques presented herein can be used to validate entire snoop filtering mechanisms and/or cache coherency protocols used within a computing system.

In one embodiment, a testing engine is configured to build multiple n-way SMP test cases to verify and validate processor(s) within a computing system, where n corresponds to the number of processors. Once built, the testing engine allocates the memory (associated with the test case(s)) in a false-sharing manner. Put differently, the testing engine allocates the memory such that the cache lines are divided into different non-overlapping blocks (e.g., each processor occupies a different byte on the same cache line). The non-overlapping blocks can be exclusively accessed by different test cases or different pseudo streams within a given test case.

Once allocated, the testing engine initially schedules the test cases for execution across different cores within a given chip. Because the test cases are allocated in a false sharing manner, as a result of the execution, the same cache lines can be accessed by multiple cores in that chip and thus by multiple different caches. In some embodiments, the testing engine is also configured to spread/re-schedule the test cases (without regenerating the test cases) on different cores or chips of a computing system. For example, the testing engine can spread the test cases across different cores (or chips) or different nodes of a computing system depending upon the configuration of the system under test. The testing engine can vary the spreading of the test cases during re-execution of the test patterns. Doing so allows the testing engine to generate different types of cache intervention and snoop filtering across the cores/chips/nodes. For example, by allowing the same cache line to be accessed by different threads spread across different cores/chips/nodes of a system, the testing engine can increase the scope of the commands broadcasted across the system bus. As a result, the testing engine can efficiently stress the snoop filtering logic and/or cache coherency protocol implemented in the computing system, without re-generating test cases (generally associated with traditional testing systems). Put differently, by allowing the testing engine to vary the test case scheduling, the testing engine can execute the same set of test cases in each re-execution, avoiding the process of building new set of test patterns which takes a significant greater amount of time.

Note that to clearly point out novel features of the present invention, the following discussion omits or only briefly describes conventional features of information processing systems which are apparent to those skilled in the art. It is assumed that those skilled in the art are familiar with the general architecture of processors, and in particular with processors having two or more processing units each sharing main memory and peripherals (e.g., to simultaneously process programs). Further, note that many of the following embodiments use snooping protocols as a reference example of a type of cache coherency protocol that can be efficiently validated using the techniques presented herein. Those of ordinary skill in the art, however, will understand that other types of coherency protocols (e.g., directory based protocols, cache interventions, etc.) may also be tested using the techniques presented herein.

Figure 1:
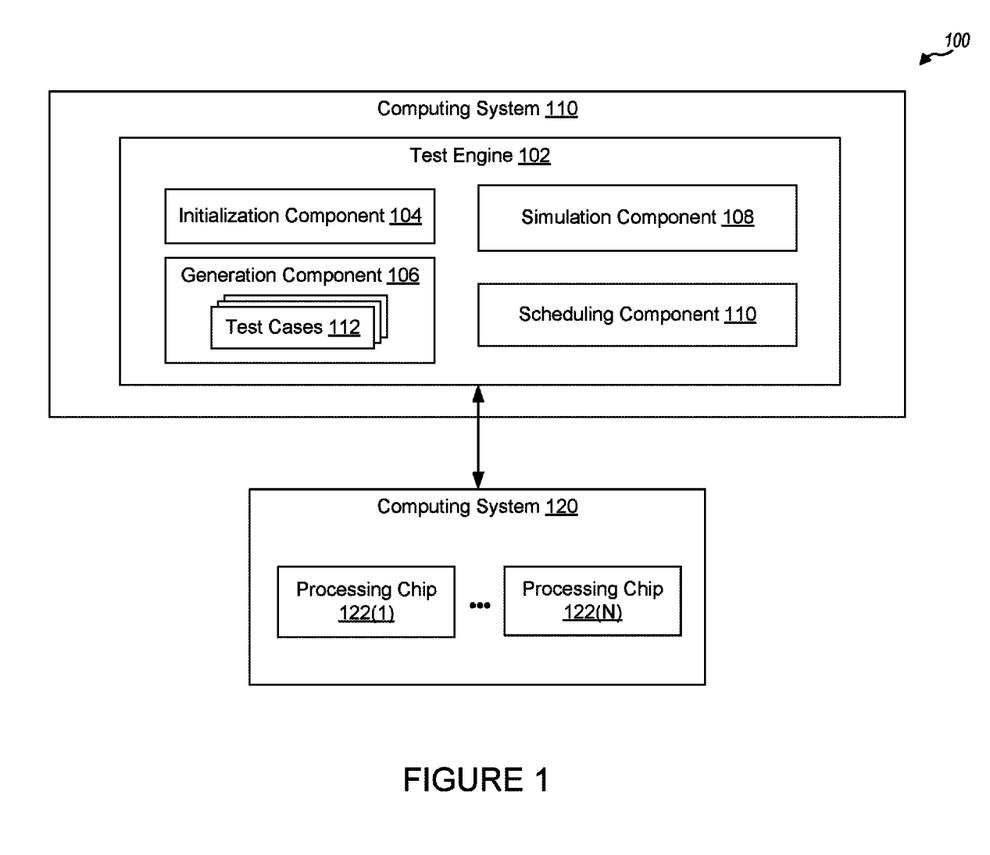
FIG. 1 illustrates an example system configured with a testing engine for verifying and validating a computing system, according to one embodiment.

FIG. 1 illustrates an example system 100 for verifying and validating a computing system, according to one embodiment. As shown, the system 100 includes computing system 110 coupled to computing system 120. In general, the computing system 110 and the computing system 120 can be any kind of physical computing system, such as a desktop computer, laptop computer, server computer, mobile device, tablet computer, and the like. The computing system 110 includes test engine 102, which is configured to test computing system 120 (e.g., for processor design verification and validation). Test engine 102 includes initialization component 104, generation component 106, simulation component 108, and scheduling component 110.

Figure 2:
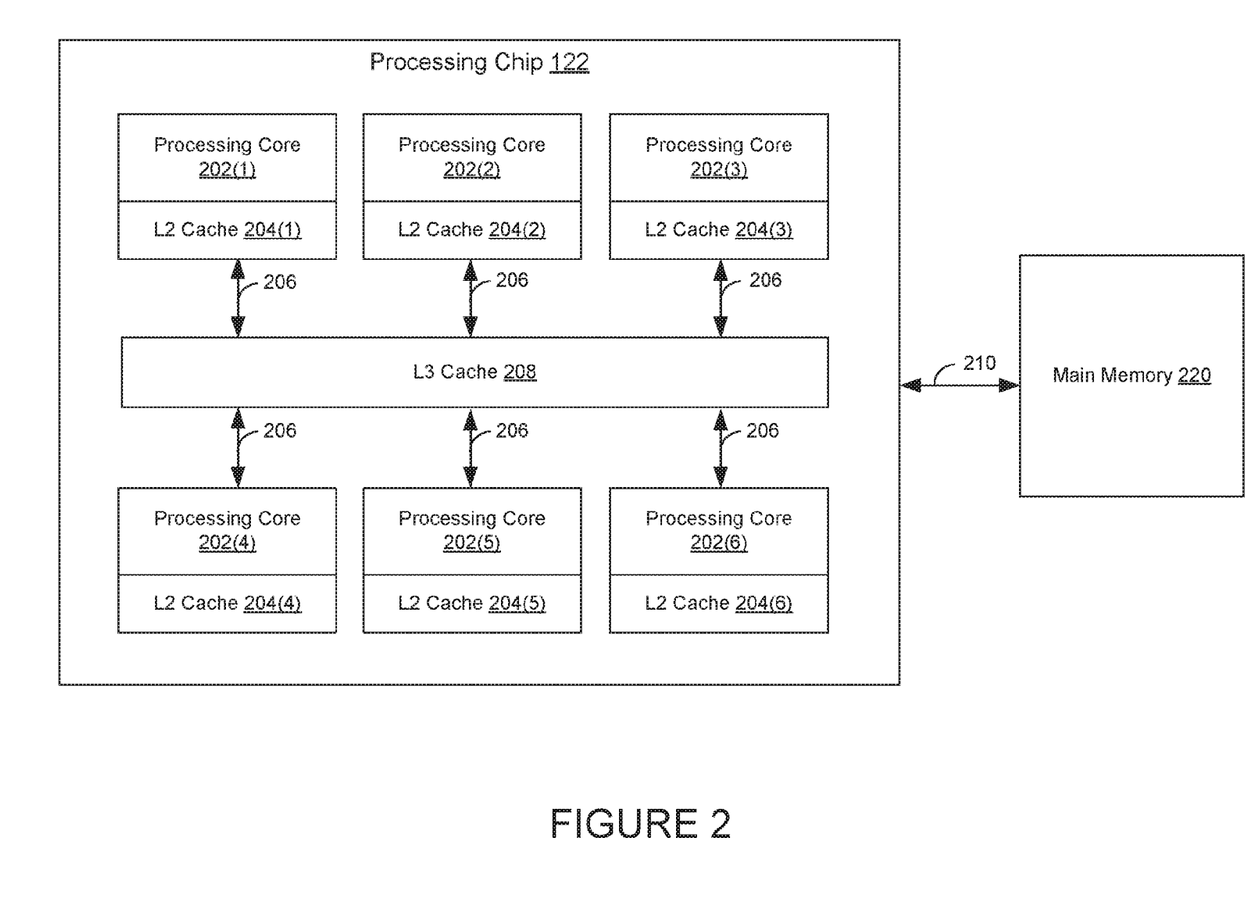
FIG. 2 illustrates an example of a processing chip within a computing system, according to one embodiment.

Computing system 120 includes one or more processing chips 122(1)-122(N). In one embodiment, each processing chip 122 may include or more processing cores (or processors). FIG. 2, for example, illustrates a reference architecture of a processing chip 122, according to one embodiment. In this embodiment, the architecture of the processing chip 122 is an example of a distributed shared memory system. As shown in FIG. 2, the processing chip 122 includes one or more processing cores 202(1)-202(6), L2 cache memories 204(1)-204(6) and L3 cache 208. Each processing core 202 may include various registers, buffers, memories, and other units formed by integrated circuitry, and may operate according to reduced instruction set computing ("RISC") techniques. Each processing core 202 may also include local memory (not shown), e.g., such as L1 cache memory, etc., integrated within the processing core 202. Each L2 cache memory 204(1)-204(6) is local (or private) to its respective processing core 202(1)-202(6). The L3 cache memory 208, on the other hand, is shared among all of the processing cores 202 via bus (or interconnect) 206. In one embodiment, the bus 206 is an on-chip interconnect fabric bus. With cache coherency protocols, such as a snoop-based cache coherence protocol, the caches (e.g., L1, L2, L3 cache memories) may communicate with each other using the on-chip interconnect fabric bus.

The processing chip 122 is also coupled to main memory 220, via bus 210. Main memory 220 may represent random access memory (RAM) devices that include the main storage for computing system 120, as well as supplemental levels of memory, e.g., cache memories, non-volatile or backup memories (e.g., programmable or flash memories), read-only memories, and the like. In one embodiment, main memory 220 may include memory storage physically located in computing system 120 or another computing device coupled to computing system 120. The processing cores 202(1)-202(6) may access local storage (not shown), their respective private L2 cache memory 204(1)-204(6), shared L3 cache memory 208, and/or main memory 220 to execute instructions associated with a given test case.

Figure 3:
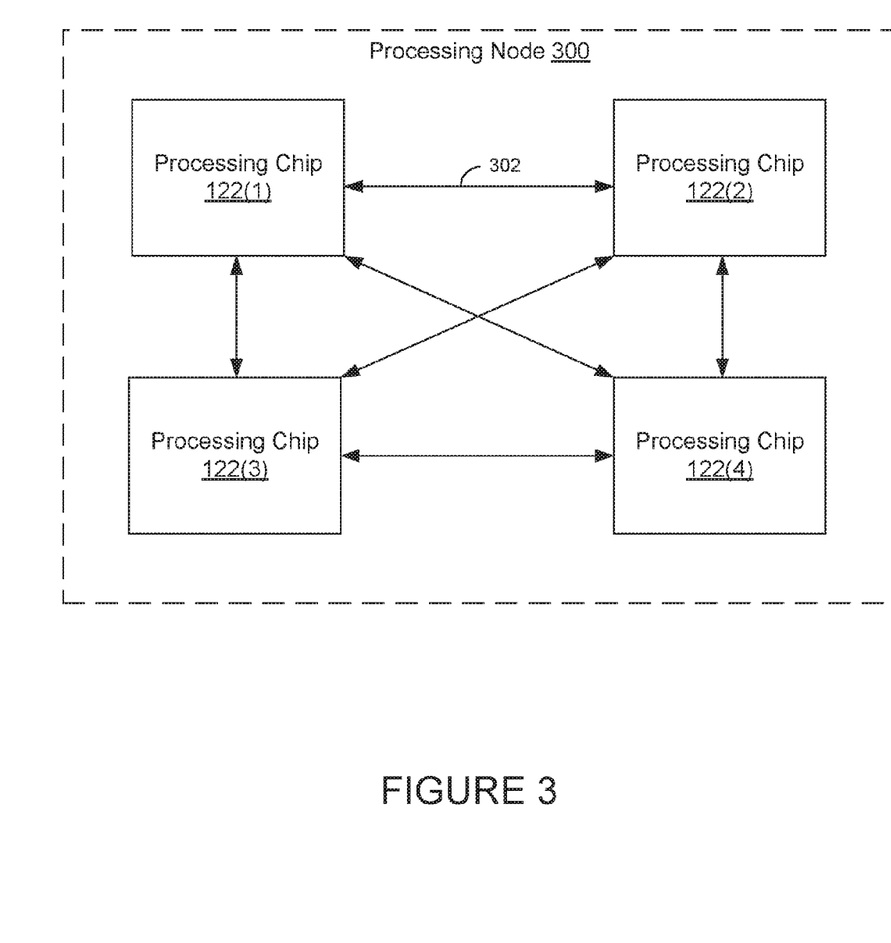
FIG. 3 illustrates an example of a computing system configured with multiple processing chips, according to one embodiment.

In some embodiments, one or more of the processing chips 122 may be coupled together to form a SMP processing node within the computing system 120. FIG. 3 illustrates one reference example of the architecture of such a processing node 300, according to one embodiment. As shown, the processing node 300 includes four processing chips 122(1)-122(4) coupled to each other via bus 302. In one embodiment, the bus 302 is an intra-node/on-node SMP fabric link that connects each of the processing chips 122(1)-122(4).

Figure 4:
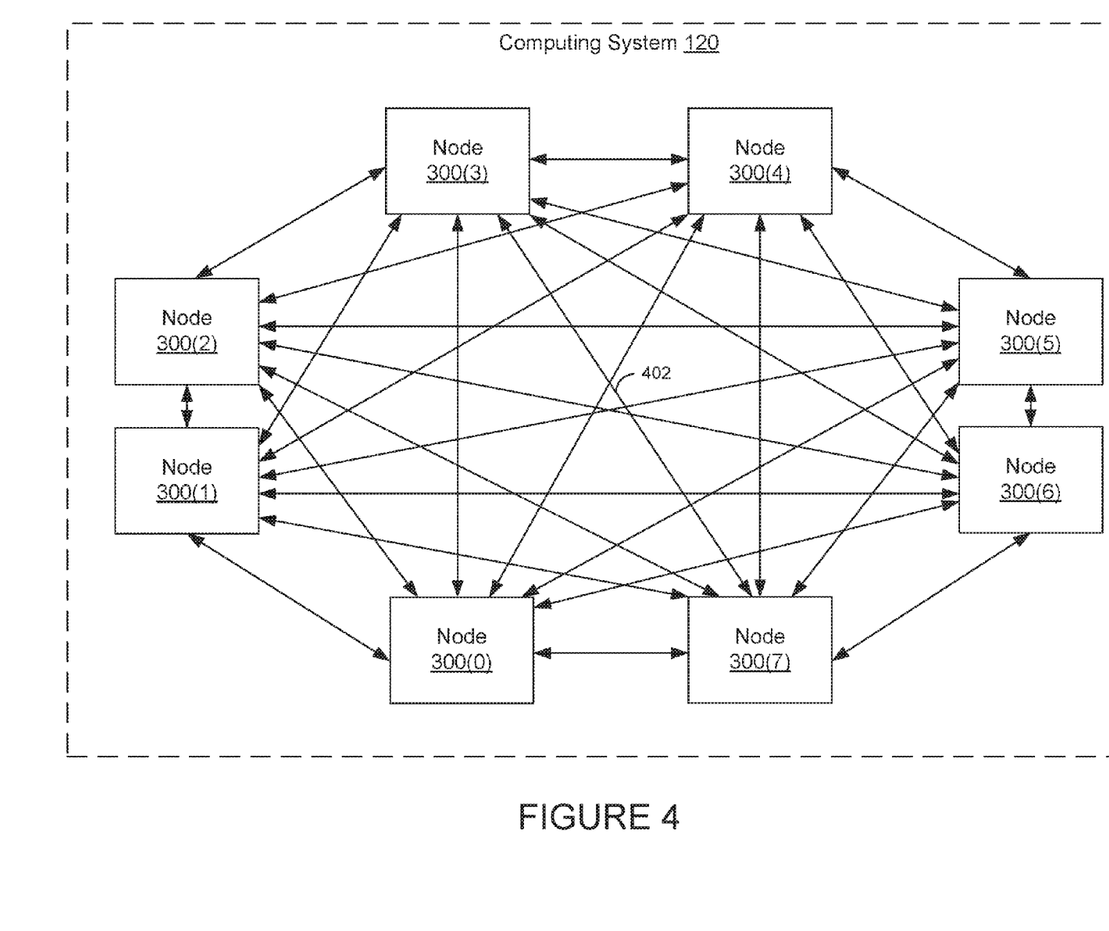
FIG. 4 illustrates an example of a computing system configured with multiple processing nodes, according to one embodiment.

Further, in some embodiments, one or more of the processing nodes 300 may be coupled together within the computing system 120. FIG. 4 illustrates one reference example of such an architecture, according to one embodiment. As shown in FIG. 4, the computing system 120 includes eight processing nodes 300(0)-300(7) coupled to each other via bus 402. In one embodiment, the bus 402 is an inter-node/off-node SMP fabric link.

As mentioned above, in multiprocessor systems (e.g., illustrated in FIGS. 2-4) with distributed shared memory, it is important to ensure that the local caches are in sync. For example, in such systems, an application may be capable of running on more than one processor. When executing such a program, multiple processors may be accessing the same data, in which case the cache line (associated with the data) can be moved from one processor to another processor. In such cases, multiprocessor systems generally employ a coherency protocol to maintain consistency between all the caches. One type of a coherency protocol is a snoop-based cache coherency protocol. Traditionally, snoop-based cache coherence is implemented in a bus-based SMP system in which caches communicate with each other via a shared bus. As part of the snooping protocol, address broadcasts are sent to the snoopers, snoop response are sent back (typically in order) to the initiating chip, and a combined snoop response broadcast is sent back to all of the snoopers. In modern large SMP systems, since broadcasting every single request to the entire system causes performance degradation, multiple levels of snoop filtering are supported to take advantage of the locality of data and processing threads. This approach reduces the amount of interlink bandwidth required, reduces the bandwidth needed for system wide command broadcasts, and maintains hardware enforced coherency using a single snooping protocol.

In SMP systems, for example, the fabric bus may initially limit the command broadcast scope to a single chip or physical group of chips (nodes) in a system. When the transaction cannot be completed coherently using this limited cope, the coherency protocol forces the command to be re-issued to all chips in the system. Further, in some embodiments, a memory coherency directory (MCD) can be used to improve overall fabric bus performance for a given computing system. The MCD improves I/O subsystem throughput by qualifying and vectoring direct memory access (DMA) reads and writes to a single target node, instead of broadcasting them to the entire SMP system. The MCD can also accelerate streaming memory write operations and reduce coherence scope false prediction latencies.

In some cases, to maintain coherency, coherency protocols (e.g., such as snoop based coherency protocols, etc.) can mark the cache line as one of multiple states to keep track of the status of the cache line as it is moved from processor to processor. One example of a protocol used to maintain states of a cache line is the MESI protocol. In MESI, every cache line is marked with one of the four following states: Modified, Exclusive, Shared and Invalid. A cache line in the "modified" state generally means the cache line is present only in the current cache and the cache line has been modified from the value in main memory. When in the "modified" state, the cache typically is required to write the data back to main memory (e.g., to make the cache consistent). A cache line in the "exclusive" state generally means the cache line is present only in the current cache (e.g., only one cache is accessing the cache at a particular time). A cache line in the "shared" state generally means the cache line is present in multiple different caches. A cache line in the "invalid" state generally means the cache line is invalid (e.g., the cache line is not present in the cache).

In general, implementing a coherency protocol with such a limited number of states (e.g., four states for the MESI protocol) may not be sufficient for large SMP systems with multiple processors (e.g., since the limited number of states may not be able to accurately account for the different transitions of the cache lines between the different processors). Referring to the computing system 120 illustrated in FIG. 4 as a reference example, the use of four states may not be sufficient to track the transitions of the cache lines between the processors within each node and between each node. As such, most SMP systems typically implement multiple sub-states of the MESI protocol (or other coherency protocols). However, the use of multiple sub-states can quickly explode into a large of number of states (as the number of processors within computing systems continues to increase). For example, in some cases, each processor could have sixteen to twenty different kinds of states, with each state constantly changing.

Consequently, the biggest challenge in verifying a particular processor (or computing system) design is that it is typically very difficult to create test generators which can span the entire coherence fabric, coherence directories and cover the complete state space for a given processor. For example, as mentioned above, in large SMP systems (e.g., such as those illustrated in FIG. 4), there can be many different states, multiple processors attempting to access the same data, the cache line size can vary (e.g., from 64 bytes to 128 bytes), etc., that make it difficult to create test cases which can test the computing system under all possible conflict transitions and scenarios.

Note that the processing chip illustrated in FIG. 2, the processing node illustrated in FIG. 3, and the configuration of nodes illustrated in FIG. 4 are shown as reference examples of the types of systems that can be efficiently tested (e.g., by the testing engine 102) using the techniques presented herein. For example, although the processing chip 122 is depicted with a certain number of processing cores and L2 cache memories, those of ordinary skill in the art will recognize that the techniques presented herein can be applied to a processing chip with any number of cores or configuration. Likewise, those of ordinary skill in the art will recognize that the techniques presented herein can be applied to different configurations of the architectures illustrated in FIGS. 3 and 4. For example, in one embodiment, the computing system depicted in FIG. 4 can include eight processing chips coupled together via the bus 402 (as opposed to eight processing nodes 300).

Referring back to FIG. 1, as mentioned above, the testing engine 102 is generally configured to generate and schedule test cases in order to verify and validate a processor(s) within the computing system 120. For example, the initialization component 104 is configured to receive initialization information (e.g., from a user, database, etc.) for generating test cases. Such initialization information can include the particular architectural details of the computing system 120 (e.g., details regarding the number of cores, threads, etc. within the computing system 120), system timing information, instruction types to execute, coherency protocol(s) implemented by the computing system, number of instructions to build in a set of test cases, etc. Once the initialization component 104 receives such information, the initialization component 104 provides the information to the generation component 106.

The generation component 106 is generally configured to generate test pattern(s) based on the initialization information provided by the initialization component 104. Each test pattern can include one or more test cases 112. Each test case 112 may include one or more instructions to be executed by (one or more of the processing cores 202 within) the processing chip 122. Each test case 112 that is running by a particular processor core 202 may access data within one of the L2 cache 204, L3 cache 208, main memory 220, etc. In one embodiment, the generation component 106 is configured to generate a set of test cases that allow the testing engine 102 to re-create (without regenerating test cases) one or more different types of cache sharing scenarios for a given computing system. For example, as described below, the generation component 106 can generate a set of test cases to simulate "food fight" (FF) scenarios, cache rolling (CR) scenarios, cache interventions, snoop windows, etc., in the computing system 120 (e.g., using only the first generated set of test cases). Put differently, the generation component 106 does not have to generate a set of test cases in order to re-create the different kinds of traffic associated with each type of scenario.

In one embodiment, the generation component 106 builds a test case(s) 112 where at least one processor is trying to access exactly the same cache line as at least one other processor. For example, the generation component 106 is configured to build a n-way test case 112 for each node in a computing system, where n corresponds to the number of processing cores in a given node. The n-way test case 112 includes n different streams of instructions which are running on the n processors and accessing data (e.g., in one or more of the L2 caches 204). Referring to the processing chip 122 (illustrated in FIG. 2) as a reference example, the generation component 106 would generate six different streams of instructions (corresponding to a six-way test case) that all share one or more cache lines. In one embodiment, the memory associated with the six different streams of instructions is allocated in a false-sharing manner. Put differently, each one of the six processors will occupy a different byte but on the same cache line. For example, if the cache line is 128 bytes, the cache line is divided into different non-overlapping blocks, which can be exclusively accessed by the particular stream of instructions for the particular processor.

Once the generation component 106 builds the test cases 112, the generation component 106 provides the test cases 112 to the simulation component 108 and the scheduling component 110. The scheduling component 110 schedules the test case(s) 112 and dispatches the test case(s) 112 to the processing cores 202 within the processing chip 122. In one embodiment, the scheduling component 110 initially schedules the test case(s) 112 such that they all get executed on different cores within a given processing chip 122. During execution, the same cache line can be accessed by multiple cores in that chip and thus by multiple different caches. Doing so in this manner generates traffic on the bus such that snoop filtering logic, "food fight" scenarios, CR scenarios, etc., associated with traffic for a given cache architecture (e.g., due to requesting cache lines) can be validated and/or verified from running the test case(s) 112. In addition, performing the initial scheduling in this manner could enable the fabric bus to initially limit the command broadcast scope only to a single processing chip 122 in a computing system. Table 1 shows one example of scheduling test cases (for eight processors within a processing chip 122) which are built to false share and the coverage generated as a result of executing the test case.

TABLE 1

Example Test Case Scheduling

| 8 Task of a Test Case (TC) Configuration on Threads (Thr) and Cores | Detail Layout of 4 TC tasks on Threads and Core | Test Case Coverage |
|---|---|---|
| (4Thr) × 2Cores | 1stTC(2Cores(4Thr) + (2ndTC(2Cr(4Thr)) + 3rdTC(2Cr(4Thr) + 4thTC(2Cr(4Thr) | Food Fight (FF) (with 64 DERAT Fully associative) |
| (2Thr) × 4Cores | 1stTC(4Cr(2Thr) + (2ndTC(4Cr(2Thr)) + 3rdTC(4Cr(2Thr) + 4thTC(4Cr(2Thr) | FF/CacheRoll. With 64 DERAT fully associative. With 128 DTLB (2 TCs per core) with 16 congruence classes and rolling 8 way associative. TLB is 4 way associative. |
| (1Thr) × 8Cores | (1stTC(8Cr(thr0) + (2ndTC(8CR(thr1)) + 3rdTC(8Cr(Thr2) + 4thTC(8Cr(Thr3) . . . Each TC on CCG0 of 4 TCA0 | FF 64 DERATS per Thread. 256 DTLB (4TCs per core) with 32 congruence classes. |

In one embodiment, after the initial scheduling of the test cases 112, the scheduling component 110 is configured to spread/re-schedule the generated test cases, without regenerating another set of test cases, across different cores or chips or different nodes of a computing system. In some embodiments, the spreading/re-scheduling is dependent upon the configuration of the computing system that is being tested. As described in more detail below with reference to FIG. 5, the scheduling component can re-schedule the test cases in any manner in order to re-create different types of cache intervention & snoop filtering scenarios for the computing system.

Figure 5:
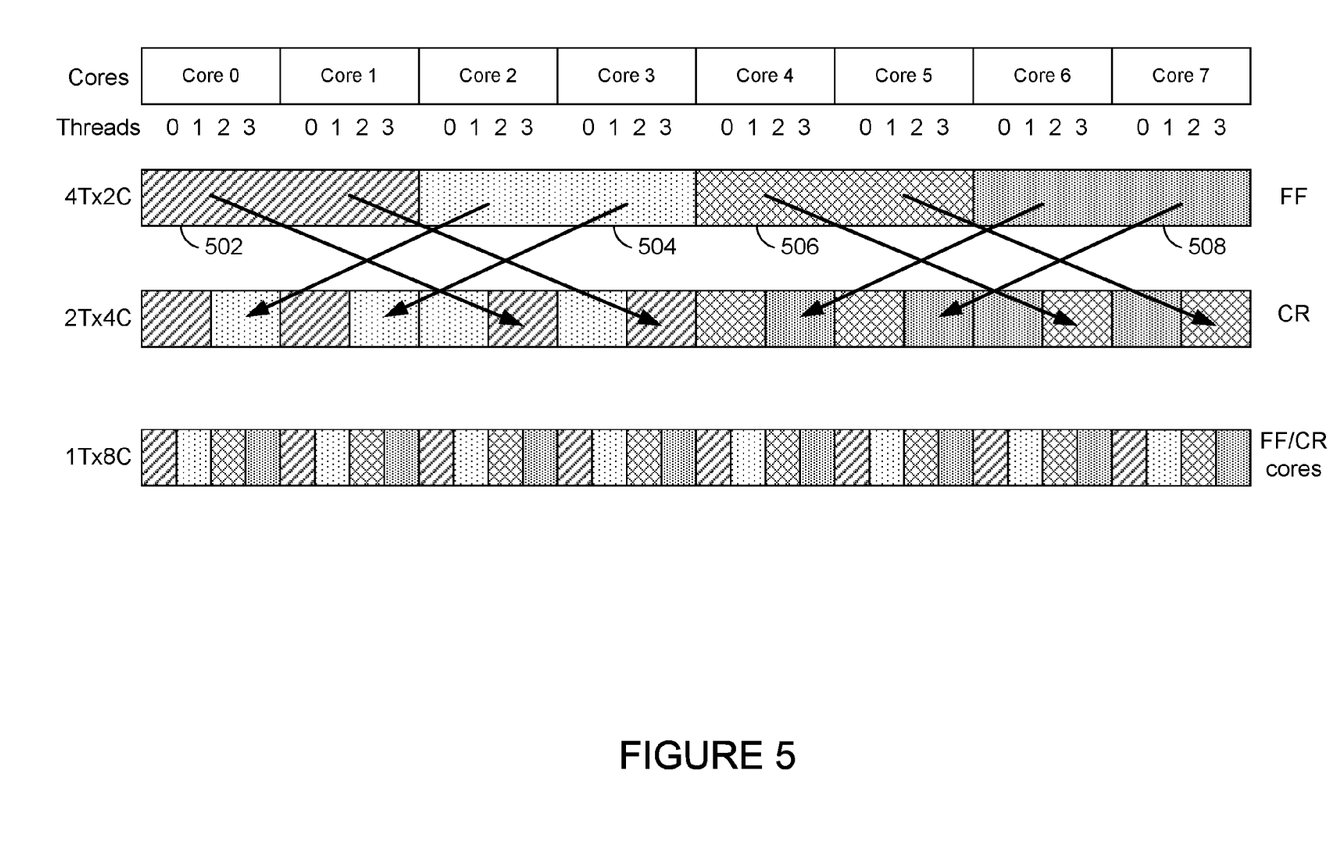
FIG. 5 illustrates an example of scheduling and re-scheduling test cases across different cores of a computing system, according to one embodiment.

FIG. 5 illustrates an example of scheduling and re-scheduling test cases across different cores of a computing system, according to one embodiment. In this particular example, the computing system includes eight processing cores (e.g., Core 0-Core 7), and each processing core includes four hardware threads. In one embodiment, each hardware thread represents a parallel processing unit, with the total number of parallel processing units being equal to the # processing cores×# of processing threads (e.g., 32 parallel processing units in this example). If a particular test case is running on two different threads within the same processing core, the two processing units will share the same L2 cache for that particular processing core. On the other hand, if a test case is running on two different cores, two different L2 caches will be used.

As shown in this embodiment, the testing engine 102 may use the generation component 106 to generate an 8-way test case with four different parallel streams of instructions, each stream of instructions corresponding to one of the processing cores C0-C7. As also shown, the generation component 106 is configured to allocate the memory associated with the test case in such a way that at least one processing core will attempt to access the same cache line(s) as at least one other processing core. For example, for the first configuration with 4 Threads×2 Cores (4T×2C), block 502 represents a first parallel stream of instructions, block 504 represents a second parallel stream of instructions, block 506 represents a third parallel stream of instructions, and block 508 represents a fourth parallel stream of instructions. The generation component 106 generates each stream of instructions, such that they span across two cores, to create a scenario where two different L2 caches will be pulling the cache line(s) back and forth at any given point in time during the execution of the test case. In this example, this particular allocation creates a "food fight" scenario. For example, once the scheduling component 110 schedules the test case for the 4T×2C configuration, a "food fight" scenario can occur where multiple threads across two any given processing cores will fight to access same cache line(s).

Once the first test case has finished executing, the scheduling component 110 is configured to re-schedule (without regenerating) the test case that was generated for the first configuration in order to test another configuration of the computing system. For example, referring to FIG. 5, the scheduling component 110 can re-schedule the test case by swapping at least one stream of instructions of the test case that was executed by one of the processing cores in the 4T×2C configuration to be re-executed by another processing core in another configuration (e.g., such as the 2T×4C) configuration. As shown, the scheduling component 110 can re-schedule the test cases such that the stream of instructions for block 502 are re-scheduled to run on processing cores C2 and C3, the stream of instructions for block 504 are re-scheduled to run on processing cores C0 and C1, the stream of instructions for block 506 are re-scheduled to run on processing cores C6 and C7, and the stream of instructions for block 508 are re-scheduled to run on processing cores C4 and C5. As a result of the re-scheduling, two threads from each processing core (e.g., threads 0 and 1) are sharing the same cache line(s) as the other two threads (e.g., threads 2 and 3). By re-scheduling the test case in this manner, the scheduling component 110 can generate different kinds of traffic, transitions, conflicts, etc., between the caches to determine if the computing system meets performance requirements. For example, once the scheduling component 110 re-schedules the test case for the 2T×4C configuration, multiple test cases may be running parallel in the same core. In these situations, a "cache rolling" scenario can occur where each test case attempts to get their own line in the cache (e.g., by removing data from a cache line to make room for a new cache line). The scheduling component 110 can continue re-scheduling the test-case in this manner to test another configuration of the processor. For example, as shown for the 1T×8C configuration, the scheduling component 110 is configured to re-schedule the test cases such that each of the threads within a core attempt to access the same cache line(s) in order to execute different streams of instructions.

Note that the embodiment depicted in FIG. 5 illustrates merely one example of scheduling/re-scheduling a test case across different configurations of a processing chip within a computing system. Those of ordinary skill in the art will understand that the techniques presented herein can be used for other configurations, and can be used to test other types of traffic that may be present on a system bus due to the use of shared memory.

As mentioned above, traditional testing systems typically generate new test cases to test each new configuration of a given computing system. The generation of a new test case, however, pollutes the state of the cache associated with the test case, which prevents the leveraging of the previous state. Embodiments presented herein allow the scheduling component 110 to maintain the state of the cache for the test case that was previously executed while simultaneously re-scheduling the previous test case for re-execution. In some cases, the scheduling component 110 may initialize the cache lines in each of the caches (for a given computing system to be tested) to zero before generating and scheduling the first test case. By initializing the caches to zero, the scheduling component 110 can use the initial execution of the first test case (e.g., such as 4T×2C) to warm up the caches, access and retain the previous state.

Typically, when re-scheduling, the scheduling component 110 may have to wait until the previous test case has ended. For example, in some cases, if the re-scheduled test case starts executing before the previous test case has finished executing, the re-scheduling can interfere with the results of the previous test case. At the same time, however, if the scheduling component 110 has to wait for each processing core to finish a given stream of instructions before re-scheduling the instructions, the time associated with re-scheduling can take too long. Further, the scheduling component 110 might not be able to create certain conflicts that arise only when commands arrive on the bus within certain timing windows if the scheduling component 110 has to wait until all processing cores have completed executing a previous test case.

As such, techniques presented herein allow the scheduling component to re-schedule test cases for a subset of the processing cores in order to create timing scenarios for testing. In one embodiment, the scheduling component 110 can determine which processing cores it will not wait for before commencing re-scheduling. For the remaining processing cores, the scheduling component 110 can wait until those cores finish executing a stream of instructions before re-scheduling. In some embodiments, the scheduling component 110 may make the determination based on the number of timing scenarios the testing engine wants to create in a given computing system. Doing so in this manner, allows the scheduling component to refrain from disturbing or spoiling the results of an entire test case, while at the same time allowing the scheduling component to create all possible scenarios of the different types of traffic that can happen from simultaneously accessing the same caches.

Figure 6:
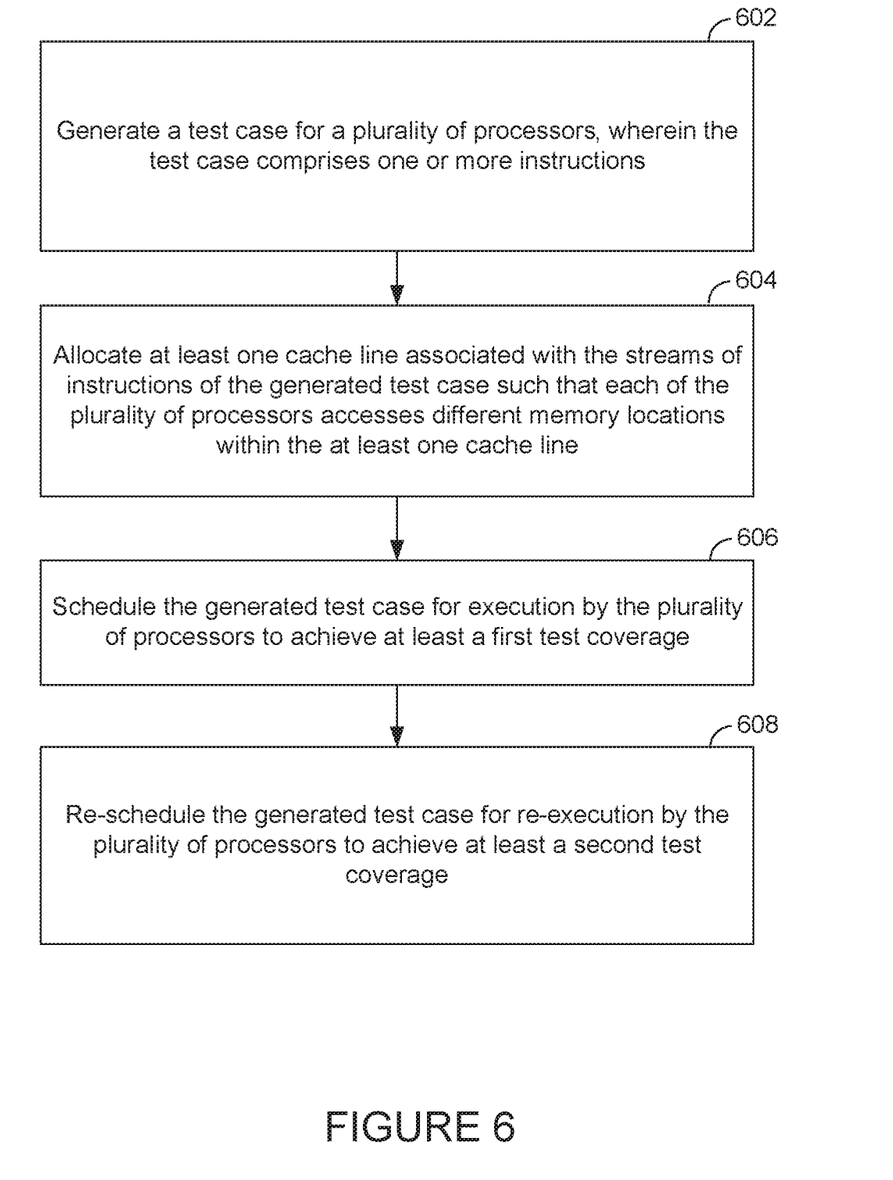
FIG. 6 illustrates a method for verifying and validating coherency and snoop filtering mechanisms in a computing system, according to one embodiment.

FIG. 6 illustrates a method 600 for verifying and validating coherency and snoop filtering mechanisms in a computing system, according to one embodiment. As shown, the method 600 begins at step 602, where the testing engine 102 generates a test case for a plurality of processors. In one embodiment, the test case includes one or more streams of instructions. In one embodiment, each one of the one or more streams of instructions also corresponds to a respective one of the processors. At step 604, the testing engine 102 allocates at least one cache line associated with the streams of instructions of the generated test case such that each of the plurality of processors accesses different memory locations within the at least one cache line. At step 606, the testing engine 102 schedules the generated test case for execution by the plurality of processors to achieve at least a first test coverage among the plurality of processors. In one embodiment, for example, the test coverage may include at least one of a food fight scenario, cache rolling scenario, interventions, snoop window events, etc. among the plurality of processors.

In one embodiment, as part of scheduling, the testing engine 102 is configured to spread the generated test case across different configurations of the plurality of processors. Each configuration may specify a number of hardware threads for one or more of the plurality of processors that have access to the same cache line associated with the generated test case. Referring back to the 4T×2C test case illustrated in FIG. 5, a first configuration of the plurality of processors can specify that the hardware threads in C1 and C2 have access to the same cache line associated with the stream of instructions for block 502, the hardware threads in C2 and C3 have access to the same cache line(s) associated with the stream of instructions for block 504; and so on. In one embodiment, the testing engine 102 is configured to spread the generated test case across the different configurations in the manner depicted in FIG. 5 (e.g., 4T×2C to 2T×4C to 1T×8C). Note, however, that the testing engine 102 may also spread the generated test case in other manners (e.g., from 8T×1C to 2T×4C to 1T×8C, etc.).

At step 608, the testing engine 102 re-schedules, without regenerating another test case, the generated test case for re-execution by the plurality of processors to achieve at least a second test coverage among the plurality of processors. In one embodiment, the second test coverage may include at least one of a food fight scenario, cache rolling scenario, interventions, snoop window events, etc. among the plurality of processors. In one embodiment, the second test coverage may be of the same type or different type as the first test coverage.

In one embodiment the testing engine 102 is also configured to pair different subset of streams of instructions associated with the generated test case. For example, as mentioned above, based on a number of timing scenarios the testing engine 102 wants to create, after scheduling the paired streams of instructions to be executed by a first set of processors, the testing engine 102 can re-schedule the subset of instructions for execution by a second set of processors, without waiting for the first set of processors to finish executing the subset of instructions. In this manner, the testing engine 102 can swap a given number of instructions of a test case without syncing up all streams of instructions for a given test case.

Figure 7:
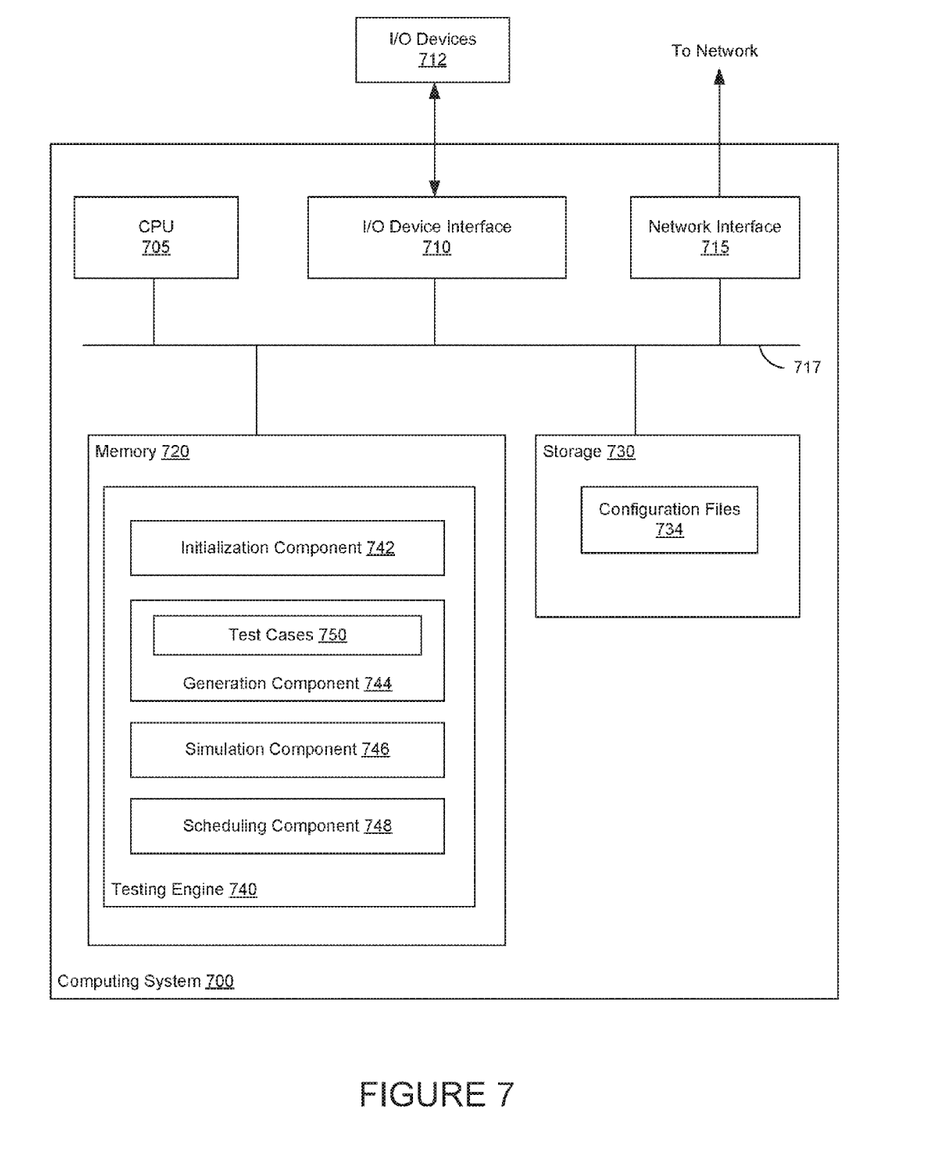
FIG. 7 illustrates a block diagram of a computing system configured to verify and validate another computing system, according to one embodiment.

FIG. 7 illustrates a computing system 700 configured to perform parallel zeroing of memory, according to one embodiment. As shown, the computing system 700 includes, without limitation, a central processing unit (CPU) 705, a network interface 715, a memory 720, and storage 760, each connected to a bus 717. The computing system 700 may also include an I/O device interface 710 connecting I/O devices 712 (e.g., keyboard, mouse, and display devices) to the computing system 700. Further, in context of this disclosure, the computing elements shown in the computing system 700 may correspond to a physical computing system (e.g., a system in a data center) or may be a virtual computing instance executing within a computing cloud.

The CPU 705 retrieves and executes programming instructions stored in the memory 720 as well as stores and retrieves application data residing in the memory 720. The interconnect 717 is used to transmit programming instructions and application data between CPU 705, I/O devices interface 710, storage 730, network interface 715, and memory 720. Note CPU 705 is included to be representative of a single CPU, multiple CPUs, a single CPU having multiple processing cores, and the like. Memory 720 is generally included to be representative of a random access memory. The storage 730 may be a disk drive storage device. Although shown as a single unit, storage 730 may be a combination of fixed and/or removable storage devices, such as fixed disc drives, removable memory cards, or optical storage, network attached storage (NAS), or a storage area-network (SAN). The storage 730 includes configuration files 734.

Illustratively, the memory 720 includes testing engine 740. Testing engine 740 includes initialization component 742, generation component 744, simulation component 746 and scheduling component 748. The initialization component 742 is configured to provide initialization information for the generation of test cases to the generation component 744. The generation component 744 generates a set of n-way test cases 750 whose memory is allocated in a false-sharing manner. Once generated, the test cases 750 are provided to the simulation component 746 and the scheduling component 748. The scheduling component 748 schedules/re-schedules the test cases, without regeneration, in order to efficiently validate coherency and snooping filter mechanisms used within a given computing system. In some embodiments, the generation component 744 and the scheduling component 748 generally represent logic (e.g., a software application, device firmware, an ASIC, etc.) that is configured to implement or more of the techniques presented herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present disclosure, other and further embodiments of the invention may be devised without departing from the basic scope thereof, and the scope thereof is determined by the claims that follow.

What is claimed is:

1. A computer-implemented method, comprising:
generating, by a first computing system, a test case for a plurality of processors in a second computing system, wherein the test case comprises streams of instructions;
allocating, by the first computing system, at least one cache line associated with the streams of instructions of the test case such that each of the plurality of processors accesses different memory locations within the at least one cache line; and
scheduling, by the first computing system, the test case for execution by the plurality of processors to achieve at least a first test coverage among the plurality of processors, wherein scheduling the test case comprises spreading the test case across a plurality of different configurations of the plurality of processors without regenerating the test case for each of the plurality of different configurations, each of the plurality of different configurations specifying a number of hardware threads for one or more of the plurality of processors that have access to the at least one cache line associated with the test case.

2. The computer-implemented method of claim 1, wherein spreading the test case across the plurality of different configurations comprises:
executing the test case for a first configuration of the plurality of different configurations, wherein the first configuration specifies that a first number of hardware threads for each of at least a first one or more processors of the plurality of processors accesses the at least one cache line associated with the test case.

3. The computer-implemented method of claim 2, wherein the first number of hardware threads comprises four hardware threads, and wherein the first one or more processors comprises at least two processors.

4. The computer-implemented method of claim 2, wherein after executing the test case for the first configuration, the computer-implemented method further comprising:
executing the test case for a second configuration of the plurality of different configurations, wherein the second configuration specifies that a second number of hardware threads for each of at least a second one or more processors of the plurality of processors accesses the at least one cache line associated with the test case.

5. The computer-implemented method of claim 4, wherein the second number of hardware threads comprises two hardware threads, and wherein the second one or more processors comprises at least four processors.

6. The computer-implemented method of claim 4, wherein after executing the test case for the second configuration, the computer-implemented method further comprising:
executing the test case for a third configuration of the plurality of different configurations, wherein the third configuration specifies that a third number of hardware threads for each of the plurality of processors accesses the at least one cache line associated with the test case.

7. The computer-implemented method of claim 6, wherein the third number of hardware threads comprises a single hardware thread.

8. A system, comprising:
a processor; and
a memory storing program code, which, when executed on the processor, performs an operation comprising:
generating a test case for a plurality of processors, wherein the test case comprises streams of instructions;
allocating at least one cache line associated with the streams of instructions of the test case such that each of the plurality of processors accesses different memory locations within the at least one cache line; and
scheduling the test case for execution by the plurality of processors to achieve at least a first test coverage among the plurality of processors, wherein scheduling the test case comprises spreading the test case across a plurality of different configurations of the plurality of processors without regenerating the test case for each of the plurality of different configurations, each of the plurality of different configurations specifying a number of hardware threads for one or more of the plurality of processors that have access to the at least one cache line associated with the test case.

9. The system of claim 8, wherein spreading the test case across the plurality of different configurations comprises:
executing the test case for a first configuration of the plurality of different configurations, wherein the first configuration specifies that a first number of hardware threads for each of at least a first one or more processors of the plurality of processors accesses the at least one cache line associated with the test case.

10. The system of claim 9, wherein the first number of hardware threads comprises four hardware threads, and wherein the first one or more processors comprises at least two processors.

11. The system of claim 9, wherein after executing the test case for the first configuration, the operation further comprising:
    executing the test case for a second configuration of the plurality of different configurations, wherein the second configuration specifies that a second number of hardware threads for each of at least a second one or more processors of the plurality of processors accesses the at least one cache line associated with the test case.

12. The system of claim 11, wherein the second number of hardware threads comprises two hardware threads, and wherein the second one or more processors comprises at least four processors.

13. The system of claim 11, wherein after executing the test case for the second configuration, the operation further comprising:
    executing the test case for a third configuration of the plurality of different configurations, wherein the third configuration specifies that a third number of hardware threads for each of the plurality of processors accesses the at least one cache line associated with the test case.

14. The system of claim 13, wherein the third number of hardware threads comprises a single hardware thread.

15. A computer program product, comprising:
    a computer-readable storage medium having computer-readable program code embodied therewith, the computer-readable program code executable by one or more computer processors to perform an operation, the operation comprising:
    generating a test case for a plurality of processors, wherein the test case comprises streams of instructions;
    allocating at least one cache line associated with the streams of instructions of the test case such that each of the plurality of processors accesses different memory locations within the at least one cache line; and
    scheduling the test case for execution by the plurality of processors to achieve at least a first test coverage among the plurality of processors, wherein scheduling the test case comprises spreading the test case across a plurality of different configurations of the plurality of processors without regenerating the test case for each of the plurality of different configurations, each of the plurality of different configurations specifying a number of hardware threads for one or more of the plurality of processors that have access to the at least one cache line associated with the test case.

16. The computer program product of claim 15, wherein spreading the test case across the plurality of different configurations comprises:
    executing the test case for a first configuration of the plurality of different configurations, wherein the first configuration specifies that a first number of hardware threads for each of at least a first one or more processors of the plurality of processors accesses the at least one cache line associated with the test case.

17. The computer program product of claim 16, wherein the first number of hardware threads comprises four hardware threads, and wherein the first one or more processors comprises at least two processors.

18. The computer program product of claim 16, wherein after executing the test case for the first configuration, the operation further comprising:
    executing the test case for a second configuration of the plurality of different configurations, wherein the second configuration specifies that a second number of hardware threads for each of at least a second one or more processors of the plurality of processors accesses the at least one cache line associated with the test case.

19. The computer program product of claim 18, wherein the second number of hardware threads comprises two hardware threads, and wherein the second one or more processors comprises at least four processors.

20. The computer program product of claim 18, wherein after executing the test case for the second configuration, the operation further comprising:
    executing the test case for a third configuration of the plurality of different configurations, wherein the third configuration specifies that a single hardware thread for each of the plurality of processors accesses the at least one cache line associated with the test case.

* * * * *